United States Patent

Daumal Castellon

[11] Patent Number: 5,839,325
[45] Date of Patent: Nov. 24, 1998

[54] AUTOMATICALLY ADJUSTABLE CABLE-OPERATED REMOTED CONTROL

[76] Inventor: Melchor Daumal Castellon, Diputación 455, Barcelona, Spain, 08013

[21] Appl. No.: 886,558

[22] Filed: Jul. 1, 1997

Related U.S. Application Data

[63] Continuation of Ser. No. 541,457, Oct. 10, 1995, abandoned.

[30] Foreign Application Priority Data

Oct. 10, 1994 [ES] Spain ........................ 9402114

[51] Int. Cl.$^6$ ........................ F16C 1/10
[52] U.S. Cl. ........................ 74/501.5 R; 74/502.4; 74/502.6; 403/196
[58] Field of Search ........................ 74/501.5 R, 502.4, 74/502.6; 403/196, 294, 197

[56] References Cited

U.S. PATENT DOCUMENTS

| | | | |
|---|---|---|---|
| 4,854,185 | 8/1989 | Lichtenberg et al. | 74/501.5 |
| 4,903,541 | 2/1990 | Shiota | 74/502.6 |
| 5,156,063 | 10/1992 | Kelley | 74/502.4 X |
| 5,161,428 | 11/1992 | Petruccello | 74/502.4 |
| 5,293,785 | 3/1994 | Lichtenberg | 74/502.4 |
| 5,386,887 | 2/1995 | Hilgert et al. | 74/502.4 X |
| 5,435,202 | 7/1995 | Kitamura | 74/502.4 |
| 5,544,543 | 8/1996 | Hilgert et al. | 74/502.4 |

FOREIGN PATENT DOCUMENTS

| | | |
|---|---|---|
| 0 454 306 A1 | 10/1991 | European Pat. Off. . |
| 0 508 625 A1 | 10/1992 | European Pat. Off. . |
| 9101056 | 4/1991 | Spain . |
| 1 366 325 | 9/1974 | United Kingdom . |
| 2 081 411 | 2/1982 | United Kingdom . |
| 2 222 219 | 2/1990 | United Kingdom . |
| 2 275 316 | 8/1994 | United Kingdom . |

Primary Examiner—Charles A. Marmor
Assistant Examiner—Saúl J. Rodríguez
Attorney, Agent, or Firm—Jacobson, Price, Holman & Stern, PLLC

[57] ABSTRACT

A device automatically adjusts the length of a cable in remotely controlled mechanisms, such as used in automobile acceleration. A female element is fastened to a fixed point and has, at one end, a number of internal projections equipped a their opposed surfaces with inclined teeth which are capable of working in conjunction with inclined teeth provided on the external surface of a male element to which there is fixed the end of the sheath along which the remote control cable passes.

14 Claims, 2 Drawing Sheets

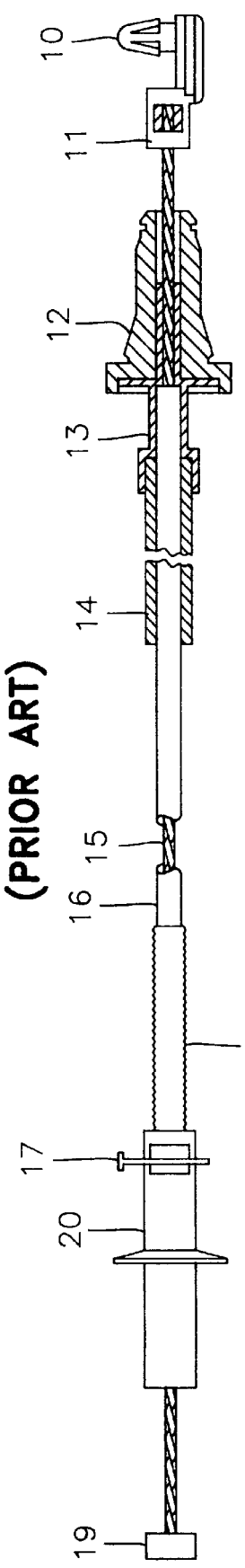
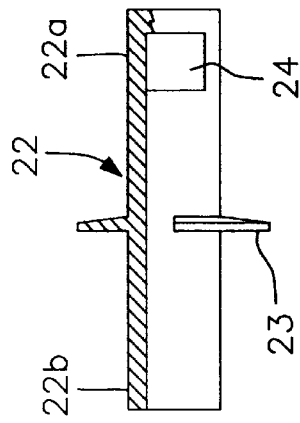
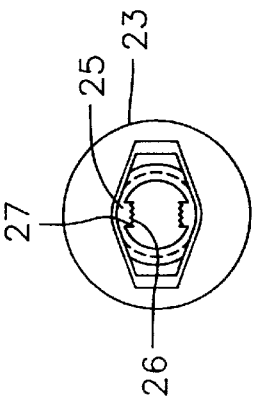
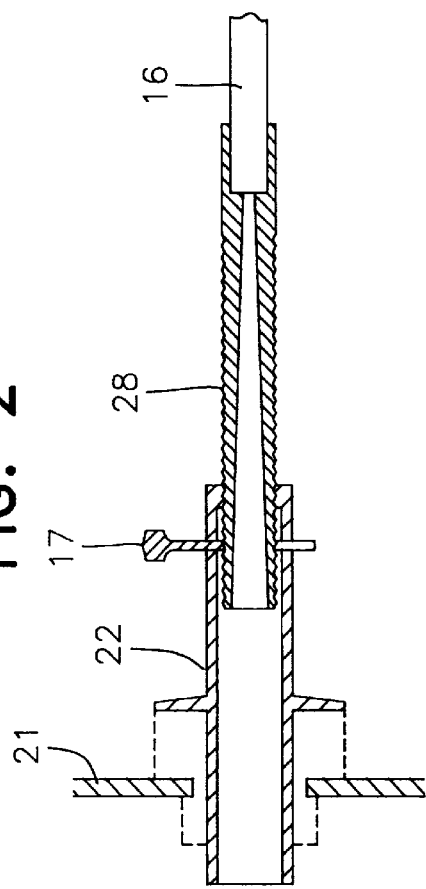
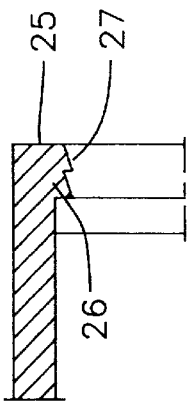

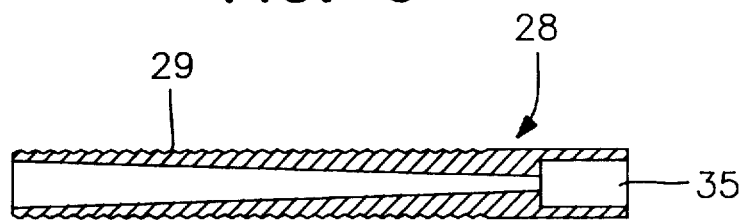
FIG. 6
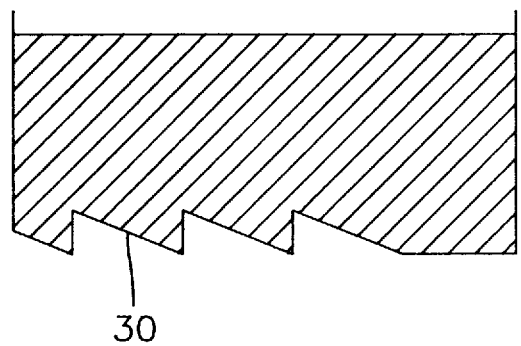
FIG. 7
FIG. 8
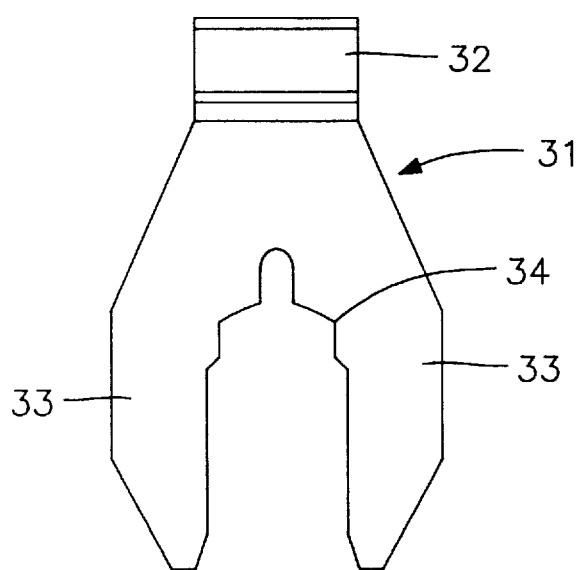
FIG. 9
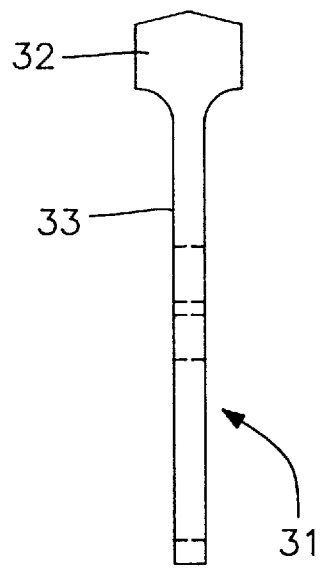

AUTOMATICALLY ADJUSTABLE CABLE-OPERATED REMOTED CONTROL

This is a continuation of application Ser. No. 08/541,457, filed Oct. 10, 1995 which was abandoned upon the filing hereof.

BACKGROUND OF THE INVENTION

1. Field of the Invention

The present invention relates to devices for automatically adjusting the effective length of cable in remote control mechanisms.

2. Description of the Related Art

The present invention constitutes an improvement to Spanish patent application invention number 9101056, filed on the 26th Apr. 1991, entitled "Device for automatically adjusting the length of the cable in remote control mechanisms" by Don Melcher Daumal Castellon Castellon applies, in a very much preferred manner, to accelerator control mechanisms in automobile vehicles, and basically consists in the provision of two elements which fit one inside the other and are connected to one another by a system of teeth which permits their relative displacement under a given load—in one direction, while locking them in the opposite direction. To be specific, the load needed to bring about the axial displacement of one of the said bodies in relation to the other has to be greater than that needed to move the butterfly valve of the accelerator, in such a way that the said axial displacement is produced only when the tension on the cable continues after the said butterfly valve has reached the limit position of maximum opening. This device is intercalated in the accelerator cable, which is divided into two sections, the ends of which are fixed to one and other of the aforesaid bodies.

The main advantage which is achieved with the device in Castellon lies in eliminating the manual operations for adjusting the length of the accelerator control cable in a final phase of the process of assembling the corresponding vehicle This adjustment is relatively complicates, given that, as is well known, it is a matter of ensuring that the limit position of the accelerator control pedal coincides, to the maximum extent, with the limit position of the butterfly valve, so that actuation of the elastic device for absorbing excess stresses that is always provided in these mechanisms is reduced to a minimum. It will also be understood that, apart from the increase in costs that derives from the above-mentioned manual adjustment, this operation entails a certain risk of errors and inaccuracies that may have important consequences.

SUMMARY OF THE INVENTION

The improvements that constitute the object of the present invention are based on the same principal as in Castellon That is to say, on the provision of two elements which fit one inside the other and which are connected to one another via a system of complementary inclined teeth which, under a stress having a value higher than a pre-established limit, permit the displacement, in one direction, of one of the said elements in relation to the other. Now in accordance with the present invention, these elements are applied to the effective adjustment of the length of the sheath 16 along which the remote control cable passes, and not to adjustment of the length of the latter, as in Castellon whereby shortening the sheath is the same as lengthening the cable, and vice versa. But more specifically, the aforesaid elements are arranged precisely at one of the terminal points of the said sheath and, specifically, at the terminal point via which, in the conventional arrangement, adjustment of the cable tension is carried out. The main advantage thereby achieved lies in greater simplicity and an appreciable reduction in the cost of constructing and fitting the assembly comprising the device, by avoiding the need to divide the remote control cable into two sections.

For the said purposes there is provided, according to the present invention, a toothed female element, which is fixed rigidly to the sheet metal of the vehicle, and a sword-like part or toothed male element which is fastened to terminal point of the sheath and which, under pressure from the latter, penetrates into the interior of the female element until it reaches the correct position—which corresponds to the required effective length of the cable—in which it is retained with complete security, given that the inclination of the teeth via which the two elements are connected totally prevents the reverse movement.

Moreover, the essential nature and main characteristics and advantages of the device forming the object of the present invention will prove more easily understandable in the light of the attached drawings, to which the explanation will refer below and which illustrate—in diagrammatic form and without being, of courses of a limitative nature in any way—a specific example of practical embodiment of the said device.

These and other objects of the invention as well as many of the intended advantages thereof, will become more readily apparent when reference is made to the following description taken in conjunction with the accompanying drawings.

BRIEF DESCRIPTION OF THE DRAWINGS

FIG. 1 is a longitudinal section, in elevation, through a device corresponding to the prior art, in which the cable tension is adjusted manually;

FIG. 2 is a longitudinal section through the adjusting terminal point produced in accordance with the invention;

FIG. 3 is a longitudinal section through the female element of the terminal point illustrated in the preceding figure;

FIG. 4 is a detail in section, on a larger scale, of the front edge of the female element, which brings about the anchoring, in relation to one direction of displacement, of the corresponding male element;

FIG. 5 is a frontal view of the same element as is illustrated in FIG. 4;

FIG. 6 is a longitudinal section through the male element of the terminal point illustrated in FIG. 2;

FIG. 7 is a detail, on a larger scale, showing the inclined toothing which is provided on the element illustrated in the preceding figure; and FIGS. 8 and 9 are front and side views, respectively, of the stop-clamp by means of which the male element can be immobilized in relation to the female element, in any desired relative position.

DETAILED DESCRIPTION OF THE PREFERRED EMBODIMENTS

FIG. 1 illustrates a prior art remote control device consisting of an end anchoring terminal point 10 which is fastened to one of the elements to be linked together, for example the accelerator control pedal; this anchoring terminal point is integral with the terminal point proper, 11, of the cable 15, which passes through a grommet 12 which is anchored rigidly to any fixed point whatsoever on the vehicle; the sheath 16, along with which the cable 15 is displaced, is fixed by one of its ends to the aforesaid grommet via a sleeve 14 and a terminal point 13; this sheath is fixed, by its opposite end, to an adjusting terminal point 18 which is normally cylindrical and the external surface of which is equipped with a succession of peripheral ribs or channels; this adjusting terminal point penetrates partially into the female element 20 rigidly fastened to a fixed point on the vehicle, and can be immobilized in any desired relative position whatsoever by means of a clamp or clip 17 which acts in conjunction with a number of lateral windows provided in the said female element and with the peripheral channels on the adjusting terminal point 18.

Finally, the free end of the cable 15 projects from the sheath and has a terminal point 19 via which it is fixed, either directly or indirectly, to the element, the control of which is being attempted, for example the lever that controls the position of the butterfly valve of the carburetor.

The manual adjustment of the cable tension is effected, as is obvious, by varying the position of the male element 18 in relation to the female element 20, that is to say, by manually inserting the former element into the latter to a greater or lesser extent, and finally immobilizing it in the chosen position by means of the clamp 17. The serious drawbacks to which this manual adjustment is subject have already been pointed out.

According to the present invention, the entire end of the device corresponding to the terminal point 10–11 is kept standard, and instead the opposite end is modified with a view to achieving automatic adjustment of the cable tension simply by carrying out, once the assembly comprising the device has been incorporated in the corresponding vehicle, an initial operation of maximum acceleration, that is to say an operation consisting in placing the accelerator pedal, or possibly some other, equivalent control member, in its limit position.

Now referring to FIGS. 2–3, according to the present invention, there is provided, for the said purposes, a first element or female element, which is similar, in its general lines, to the element 20 illustrated in FIG. 1 but differs therefrom in one essential characteristic. Thus, the former element—which has been marked, as a whole, with the reference 22—remains capable, like the latter element, of being fastened to the sheets metal 21 of the vehicle, for example by means of a grommet made of rubber or the like, which prevents the transmission of vibrations, works in conjunction with the peripheral wing 23, and has an end 22b which does not differ in any way from the end of the element 20. As shown in FIG. 4, female element 22 essentially has, near the free edge 25 of its opposite end 22a, two or more internal projections 26 which are directed towards the axial cavity into which the male element is inserted, and are equipped, on their opposed surfaces, with inclined toothing 27. In the example illustrated in the drawings, as can be seen in FIG. 5, two of these projections have been provided in a diametrically opposed manner, but this number can be increased to three, four or more regularly distributed ones, and this will enable a greater degree of security to be achieved in the fixing of the male element.

The female element 22 described works in conjunction with a sword-like part or male element, shown in FIGS. 6–7 and which has been designated, as a whole, with the reference 28. Male elements 28 is preferably, though not necessarily, generally cylindrical in shape, and essentially has an extensive zone 29 of its external surface equipped with inclined peripheral toothing 30 which is arranged so as to work in conjunction with the toothed zones 27 in the female element to which reference has been made previously. As is normal, this male element has an axial opening which is of a suitable diameter to permit the free movement of the cable 15 and terminates in an end mouthpiece or cavity 35 into which there fits, and to which there is fixed, the terminal point of the sheath 16.

The inclined teeth 27,30 are designed in such a way that—under a given load which is greater than that needed to move the butterfly valve of the accelerator but less than that developed by the spring of the device for absorbing excess stresses which is intercalated in the mechanism—they permit the displacement of the sword-like part 28 in a forward direction, towards the interior of the female element 22, but always prevents movement in a reverse direction. Under these circumstances, it will be sufficient to fit the control device in the vehicle, with the cable having a length which is less—and generally only slightly less—than the exact length needed, calculated theoretically, and to press the accelerator pedal to the maximum extent, in order to give rise automatically, once the butterfly valve of the accelerator has reached the limit position of maximum, opening, to penetration of the sword-like part into the interior of the female element, thereby shortening the effective length of the sheath (which is equivalent to lengthening the cable) until the relative position corresponding to the exact ideal length of the said cable is reached, in which the assembly is immobilized with total security, given that the inclination of the teeth 27,30 totally prevents withdrawal. Adjustment is effected, therefore, in an automatic manner and with absolute precision.

In FIGS. 8 and 9 of the drawings, there is illustrated a clamping claw of a type similar to that currently used for manually adjusting the tension of the accelerator cable in the conventional system which has been described previously. This clamp—which is marked as a whole by the reference 31—is constituted by a part which is of generally flat shape and has a certain degree of elasticity and which forms a head 32 and two arms 33, between which a stepped mouthpiece 34 is defined. This part is capable of being located, in a straddling manner, on the female element 22 which has a number of lateral openings 24 via which the arms 33 are able to act upon the male element by working in conjunction with the peripheral grooves provided on the said element (as in the conventional solution) or with the peripheral inclined teeth 30, with a view to immobilizing the said element in the relative position desired in each case.

In actual fact, according to the arrangement that constitutes the object of the present invention, it is perfectly possible to dispense with the clamp which has been described. In a preferred form of embodiment, however, the aforesaid clamp will be utilized to immobilize the sword-like part in relation to the female element, both in the initial phase in order to prevent accidental displacement of one element in relation to the other from being able to occur during the process of fitting the assembly comprising the control mechanism into the corresponding vehicle, and—possibly—in the final phase, in order to immobilize the sword-like part, with an eves greater degree of security, in the exact relative position which has been reached after the automatic adjustment has been carried out in the manner already indicated.

It will be understood that the invention cannot be regarded, in any way, as being limited to the example of embodiment described and illustrated, and that on the contrary it allows, without altering its essential nature, numerous detail modifications and additions which, of course, must be regarded as being included, in their entirety, within the scope thereof.

I claim:

1. An automatically adjusting cable operated remote control for a vehicle accelerator, the remote control comprising;
   a cable connected to a control terminal point at a first end and a controlled element at a second end,
   a cylindrical male element disposed about the cable and having a front end, a rear end, an external surface, and a first axial cavity with a decreasing diameter toward the rear end of the male element,
   inclined teeth provided along the external surface of the male element and having a rearward facing inclined surface that extends perpendicular to the external surface and faces toward the rear of said male element and a forward facing inclined surface forming a slow-rising leading edge that faces toward the front of said male element,
   a cylindrical female element disposed about the cable and having a front end, a rear end, an internal surface and a second axial cavity for receiving the front end of the male element in a forward direction at a distal end located at the front end of said female element and having a free edge, the forward direction being that in which the male element moves further into the second axial cavity of said female element, and
   internally projecting inclined toothing provided at the from end of said female element, the inclined toothing having a rearward facing surface that extends perpendicular to the internal surface and faces toward the rear of said female element and a forward facing surface forming a slow-rising leading edge that faces toward the front end of said female element, such that the teeth of the male element directionally lock with the toothing of the female element.

2. The cable operated remote control of claim 1, wherein the directional lock automatically adjusts the remote control by permitting the male element to be received in the forward direction by the female element upon application of a predetermined load, and wherein the directional lock further prevents the male element from moving in a reverse direction to preclude any extraction of the male element from the female element.

3. The cable operated remote control of claim 1, wherein the toothing of the female element comprise at least two diametrically opposed internal projections having inclined teeth capable of engaging the inclined outer peripheral teeth of the male element.

4. The cable operated remote control of claim 1, wherein the male element further comprises an end mouthpiece having inclined teeth located on an external surface that is continuous with the external surface of the male element, wherein the end mouthpiece defines a third axial cavity for fixably receiving the cable and an end of a cable sheath.

5. The cable operated remote control of claim 1, wherein the female element further comprises at least one lateral opening for receiving lateral arms of a clamp.

6. The cable operated remote control of claim 1, wherein the control terminal point comprises a vehicle accelerator control pedal.

7. The cable operated remote control of claim 1, wherein the controlled element comprises a carburetor butterfly valve.

8. The cable operated remote control of claim 1, wherein the rearward facing surface of the toothing of said female element cooperate with the rearward facing surface of the teeth of said male element to provide the directional lock.

9. An automatically adjusting cable operated remote control for a vehicle accelerator, the remote control comprising;
   a cable connected to a control terminal point at a first end and a controlled element at a second end,
   a cylindrical male element disposed about the cable and having a front end, a rear end, an external surface, and a first axial cavity for receiving at one end a cable having a decreasing diameter toward the rear end of the male element,
   inclined teeth provided along the external surface of said male element and having a rearward facing inclined surface that extends perpendicular to the external surface and faces toward the rear end of said male element and a forward facing inclined surface forming a slow-rising leading edge that faces toward the front end of said male element,
   a cylindrical female element disposed about the cable and having a front end, a rear end, an internal surface and a second axial cavity for receiving the front end of the male element in a forward direction at a distal end located at the front end of said female element and having a free edge, the forward direction being that in which the male element moves further into the second axial cavity of said female element,
   internally projecting inclined toothing provided at the front end of said female element, the inclined toothing having a rearward facing surface that extends perpendicular to the internal surface and faces toward the rear of said female element and a forward facing surface forming a slow-rising leading edge that faces toward the front end of said female element, such that the teeth of the male element directionally lock with the toothing of the female element, and
   wherein the directional lock automatically adjusts the remote control by permitting the male element to be received in the forward direction by the female element upon application of a predetermined load, and wherein the directional lock further prevents the male element from moving in a reverse direction to preclude any extraction of the male element from the female element.

10. The cable operated remote control of claim 9, wherein the toothing of the female element comprise at least two diametrically opposed internal projections having inclined teeth capable of engaging the inclined outer peripheral teeth of the male element.

11. The cable operated remote control of claim 9, wherein the male element further comprises an end mouthpiece having inclined teeth located on an external surface that is continuous with the external surface of the male element, wherein the end mouthpiece defines a third axial cavity for fixably receiving the cable and an end of a cable sheath.

12. The cable operated remote control of claim 9, wherein the female element further comprises at least one lateral opening for receiving lateral arms of a clamp.

13. The cable operated remote control of claim 9, wherein the rearward facing surface of the toothing of said female element cooperate with the rearward facing surface of the teeth of said male element to provide the directional lock.

14. An automatically adjusting cable operated remote control for a vehicle accelerator, the remote control comprising;
   a cable connected to a control terminal point at a first end and a controlled element at a second end, a cylindrical male element disposed about the cable and having a front end, a rear end, an external surface, and a first axial cavity, for receiving at one end a cable, the first axial cavity having a decreasing diameter toward the rear end of the male element, the male element further having inclined teeth provided along the external surface, a cylindrical female element disposed about the cable and defining a second axial cavity for receiving the male element in a forward direction at a distal end having a free edge, and internally projecting inclined toothing such that the teeth of the male element directionally lock with the toothing of the female element, the female element further comprising a peripheral wing fastened to a fixed position on the vehicle, and wherein the directional lock automatically adjusts the remote control by permitting the male element to be received in the forward direction by the female element upon application of a predetermined load, and wherein the directional lock further prevents the male element from moving in a reverse direction to preclude any extraction of the male element from the female element.

* * * * *